United States Patent
Huisl

(10) Patent No.: US 11,963,913 B2
(45) Date of Patent: Apr. 23, 2024

(54) FOLDABLE RAMP FOR WHEELCHAIR ACCESS TO A PASSENGER CAR REAR DOOR

(71) Applicant: API CZ S.R.O., Slapy U Tábora (CZ)

(72) Inventor: Marek Huisl, Bechyne (CZ)

(73) Assignee: API CZ S.R.O., Slapy u Tábora (CZ)

( * ) Notice: Subject to any disclaimer, the term of this patent is extended or adjusted under 35 U.S.C. 154(b) by 745 days.

(21) Appl. No.: 17/053,158

(22) PCT Filed: Mar. 25, 2019

(86) PCT No.: PCT/EP2019/057367
§ 371 (c)(1),
(2) Date: Nov. 5, 2020

(87) PCT Pub. No.: WO2019/214873
PCT Pub. Date: Nov. 14, 2019

(65) Prior Publication Data
US 2021/0145664 A1  May 20, 2021

(30) Foreign Application Priority Data
May 9, 2018 (EP) .................................... 18171557

(51) Int. Cl.
*A61G 3/06* (2006.01)
*B60P 1/43* (2006.01)

(52) U.S. Cl.
CPC .............. *A61G 3/061* (2013.01); *B60P 1/433* (2013.01); *B60P 1/436* (2013.01); *B60G 2300/13* (2013.01); *B60G 2300/30* (2013.01)

(58) Field of Classification Search
CPC .......... A61G 3/061; B60P 1/433; B60P 1/436; B60G 2300/13; B60G 2300/30
(Continued)

(56) References Cited

U.S. PATENT DOCUMENTS 4,503,722 A * 3/1985 Suzuki .................. B25J 9/1045
74/89.21
5,137,413 A    8/1992 Ressler
(Continued)

FOREIGN PATENT DOCUMENTS

EP    0 390 431 A2    10/1990
EP    0 976 376 A2    2/2000
(Continued)

OTHER PUBLICATIONS

International Search Report and The Written Opinion of the International Searching Authority dated May 29, 2019, Application No. PCT/EP2019/057367.

*Primary Examiner* — Raymond W Addie
(74) *Attorney, Agent, or Firm* — Banner & Witcoff Ltd.

(57) ABSTRACT

A foldable ramp for wheelchair access to a passenger car door, can include an entry platform which can be arranged an entry positon where the ramp is folded out of the car to allow wheelchair access to the car, a transport position where the entry platform is arranged in the car in an upright position, and a passive position where the entry platform is arranged in the car in a lying positon. The ramp can include a pivoting mechanism to mount the platform to the car, and can include an interlock configured to allow movement of the platform relative to the car and fix the platform relative to at least a section of the car.

17 Claims, 10 Drawing Sheets

Figure 1:
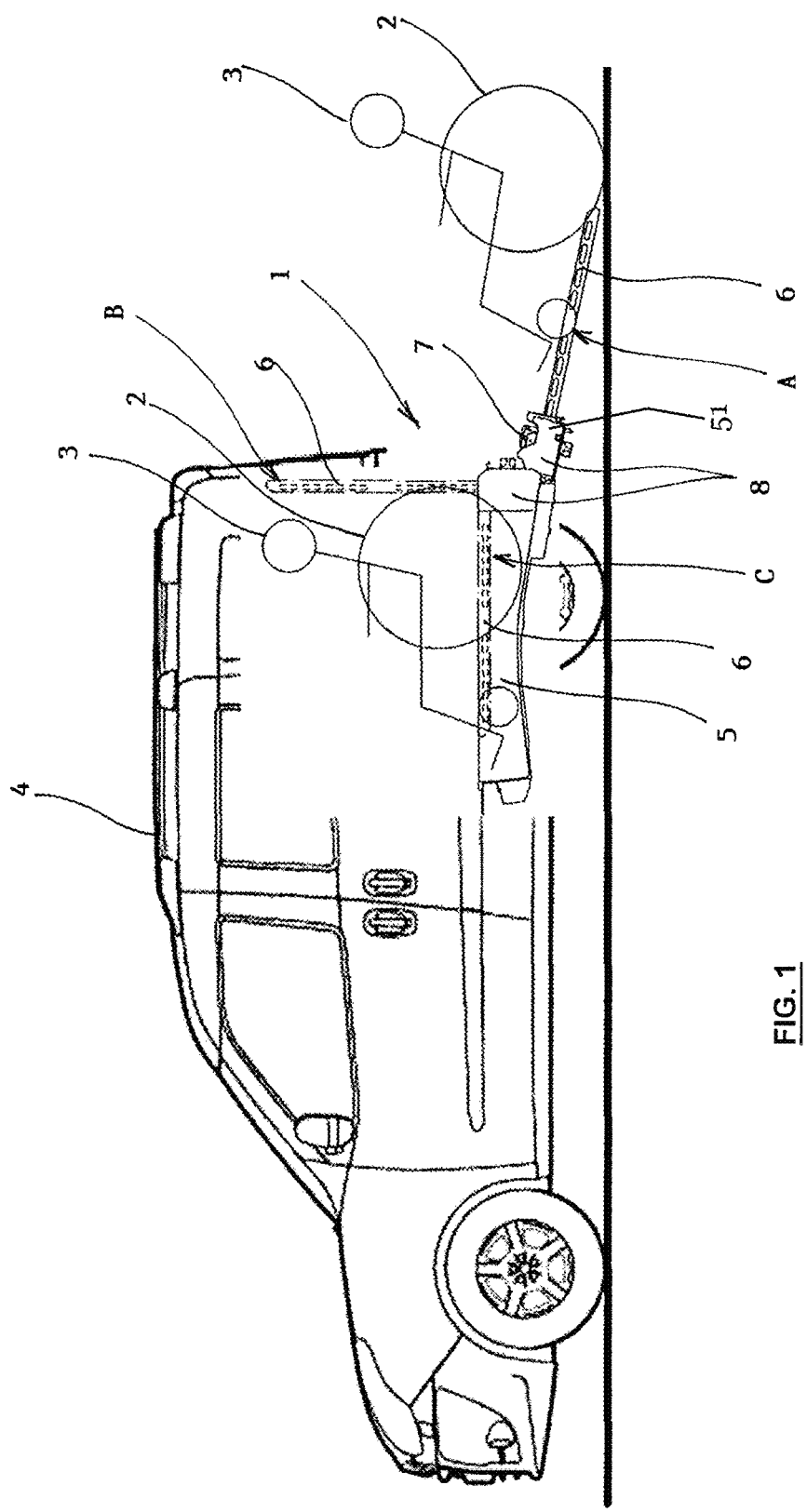

(58) Field of Classification Search
USPC .................................. 14/69.5–72.5; 116/28 R
See application file for complete search history.

(56) References Cited

U.S. PATENT DOCUMENTS

| | | | | |
|---|---|---|---|---|
| 5,306,113 | A * | 4/1994 | Mann | B60P 1/433 |
| | | | | 414/537 |
| 5,391,041 | A * | 2/1995 | Stanbury | A61G 3/067 |
| | | | | 91/464 |
| 5,449,267 | A * | 9/1995 | Ablabutyan | B60P 1/4457 |
| | | | | 187/242 |
| 8,020,234 | B2 * | 9/2011 | Johnson | A61G 3/067 |
| | | | | 14/71.3 |
| 8,234,737 | B2 | 8/2012 | Morris et al. | |
| 8,739,341 | B1 * | 6/2014 | Morris | B60P 1/433 |
| | | | | 14/71.3 |
| 8,782,840 | B2 * | 7/2014 | Saucier | B60P 1/438 |
| | | | | 14/71.3 |
| 2004/0136820 | A1 * | 7/2004 | Cohn | B60P 1/433 |
| | | | | 414/537 |
| 2008/0184500 | A1 | 8/2008 | Bettcher | |
| 2011/0088175 | A1 * | 4/2011 | Morris | B60P 1/433 |
| | | | | 14/69.5 |
| 2014/0248109 | A1 * | 9/2014 | Johnson | A61G 3/061 |
| | | | | 414/537 |

FOREIGN PATENT DOCUMENTS

| | | |
|---|---|---|
| EP | 1 535 592 A1 | 6/2005 |
| EP | 2293755 A1 | 3/2011 |
| EP | 3400923 A1 | 11/2018 |
| FR | 2 597 801 B1 | 7/1990 |
| GB | 2 275 030 A | 8/1994 |
| GB | 2 301 082 A | 11/1996 |
| JP | 2014227095 A | 12/2014 |
| JP | 5765241 B2 | 8/2015 |
| WO | 97/02171 A1 | 1/1997 |
| WO | 0009060 A1 | 2/2000 |
| WO | 0 305 96 85 A2 | 7/2003 |

* cited by examiner

FOLDABLE RAMP FOR WHEELCHAIR ACCESS TO A PASSENGER CAR REAR DOOR

CROSS REFERENCE TO RELATED APPLICATIONS

This patent application is a U. S. National Stage Application of PCT/EP2019/057367, filed Mar. 25, 2019, which claims priority to European Patent Application No. 18171557.4, filed May 9, 2018, each of which is incorporated herein by reference in its entirety.

BACKGROUND

Field

The disclosure hereunder concerns a foldable ramp designed particularly to get manual and electric wheelchairs into and out of a vehicle through the rear door.

Background

There are many devices facilitating movement into and out of vehicles, as well as transport, of persons bound to a wheelchair and they can be also used for electric scooters and similar equipment provided with travel wheels. The devices differ depending on the purpose and type of the vehicle.

At present, an important portion of vehicles are those operated in the so-called combined operation. This means that vehicles are used alternately for transport of healthy persons or regular loads and also for transport of disabled persons, persons with health-related limitations or physical disability who need to use wheelchairs. In practical terms, they include vehicles used by e.g. taxi services, hotels, travel agencies, as well as family cars used intermittently for regular daily transport for private and business purposes, as well as for transport of a person in a wheelchair.

It is therefore desirable that the foldable ramp takes up as little space inside the vehicle as possible and that normal operation of the vehicle is possible when the ramp is folded. It is also necessary that the control of folding of the ramp in and out is simple, safe and physically undemanding even for persons who are not physically strong or who may have certain limitations due to their health condition or age.

The patent document FR 2 597 801 discloses a vehicle with a lowered rear portion where the ramp is folded out into the entry position by means of a hydraulic mechanism and, at the same time, the whole rear portion of the vehicle is being lowered. This solution is very complicated and it represents a significant interference in the chassis set up of the vehicle.

The patent documents GB 2 275 030, WO 97/02171, EP 0 390 431, WO 0 305 96 85 and U.S. Pat. No. 5,137,413 disclose foldable ramps, pivotally attached in the rear portion of the lowered floor of the vehicle. The lowered floor is adapted to receive the wheelchair and it is therefore necessary to solve the new placement of the fuel tank, the exhaust and the reserve wheel. The entry platform of the ramp is in entry position folded out of the vehicle from the rear door towards the ground; in the transport position it is vertically lifted between the wheelchair and the rear door. The important disadvantage of this solution consists in the fact that after the wheelchair moves out of the vehicle, the ramp lingers in the vertical position and in every other operation of the vehicle, e.g. loading of luggage, the ramp must be first folded out and then folded in the vehicle. Vehicles with this adjustment are appropriate for one purpose operation, not for a universal one.

The patent documents EP 1 535 592, GB 2 301 082 and EP 0 976 376 disclose manually foldable ramps or stairs. The ramp is formed by a floor well on the front edge of which, also forming the edge of the rear part of the vehicle, the entry platform/stair is pivotally attached by means of a hinge. The entry platform operates in two positions, after the wheelchair has entered the car it can be folded in the floor well. The platform does not have a vertical transport position, i.e. it cannot be used at the same time for the entry and for the standing position of the wheelchair and the wheelchair after having entered the vehicle must continue further into the vehicle. This solution is also more appropriate for buses or trolley buses. Similar disadvantages can be found also in solution with two-part motor-driven entry ramps described in U.S. Pat. No. 8,234,737 and US 2008/0184500A1.

There is also a solution which discloses a manually foldable ramp connected to a lowered floor (floor well) in the rear part of the vehicle according to the published patent application WO 0009060. There is a lowered floor well created in the rear part of the vehicle. The passenger in a wheelchair moves into the well on a one-part or two-part platform attached to the edge of the well by means of a pivotal hinge. If the platform is made of one part, it is lifted up to a vertical transport position between the wheelchair and the door and it is locked by a safety latch. After the wheelchair moves out of the vehicle, the platform is folded into the vehicle, while the pivotal hinge must be moved into another height configuration, and it covers the floor well. In this position there is a luggage room created in the rear part of the vehicle corresponding to common vehicles, with no limitation of access. If the platform is made of two parts there is no need to change the height configuration of the pivotal hinge. In the entry position of the wheelchair and in the transport position both parts are in an interlocking position. After the wheelchair moves out of the vehicle the locking is released and the second part of the platform is folded on the floor well, while the first part creates the rear face. The construction and production of this solution is very simple, however the manipulation with the ramp is impractical, since the manipulation with the platform is complicated for one person. The platform is not balanced, its center of gravity is far from the edge of the vehicle and it is necessary to operate with both parts of the platform.

Finally, there is a solution of a foldable ramp under EP 2293755. The solution consists in tiltable side parts on the opposite sides that are pivotally attached to the edge of the floor well and the entry platform can move between them. The tiltable side parts rotate from the vertical position into the entry position and vice versa. In the vertical position they are secured with side latches. Movable fitment of the entry platform in the tiltable side parts makes it possible to fold the entry platform inside the vehicle to the floor level to the so-called passive position, while the tiltable side parts are in a vertical position. For this purpose the entry platform is on its sides provided with metal sheet carriers that perform rotationally translational movement in respect to the tiltable side parts. The trajectory of this movement is defined with guiding shaped grooves created in tiltable side parts and in carriers and with pins that fall into such guiding grooves. The vertical position of the entry platform is identified as a transport position. The rear door in this position is closed and the wheelchair with the transported person is located and secured in front of the entry platform arrested in the transport position. In order to safely arrest the entry platform in the transport position the guiding shaped grooves are at their ends terminated with recesses directed vertically downwards. When the entry platform is raised up the pins fall into the recesses and the entry platform is arrested in the transport position.

A disadvantage of the solution with guiding grooves and recesses under EP 2 293 755 is that when the entry platform folds into a passive position it needs to be manually lifted up to slide out from the recesses and only then it can be folded. This requires significant physical strength which may be a problem for some users. In one advantageous embodiment of the solution under EP 2 293 755 a spring is attached between the tiltable side part and the carrier, which operates against gravitation when the entry platform is folded from the transport position into the passive position and it also facilities lifting of the entry platform from the passive position into the transport position. However, a disadvantage of the spring is that during lifting of the entry platform and slipping out from the recess the user needs to overcome the force of the spring and so the manipulation at this stage is even more demanding than in case of the design without the spring. Another disadvantage of the spring is that its force is not even. When folding the entry platform into the passive position the entry platform abruptly hits edges of the lowered floor well, while during lifting into the transport position it abruptly swings in the final stage of the lifting. Moreover, the spring does not make manipulation with the entry platform any easier in the course of its movement from the transport position into the entry position, and vice versa, and the user needs to fold and lift the full weight of the entry platform.

Therefore, this disclosure seeks to create a foldable ramp which would eliminate disadvantages of the solution under EP 2 293 755, particularly, reduce physical demands of the operation when the entry platform changes its position, make the movement of the entry platform smooth, eliminate shock actions and make the control of the entry platform easier.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 schematic side view of a vehicle with the foldable ramp in entry position A, transport position B and passive position C, according to an exemplary embodiment.

Figure 2:
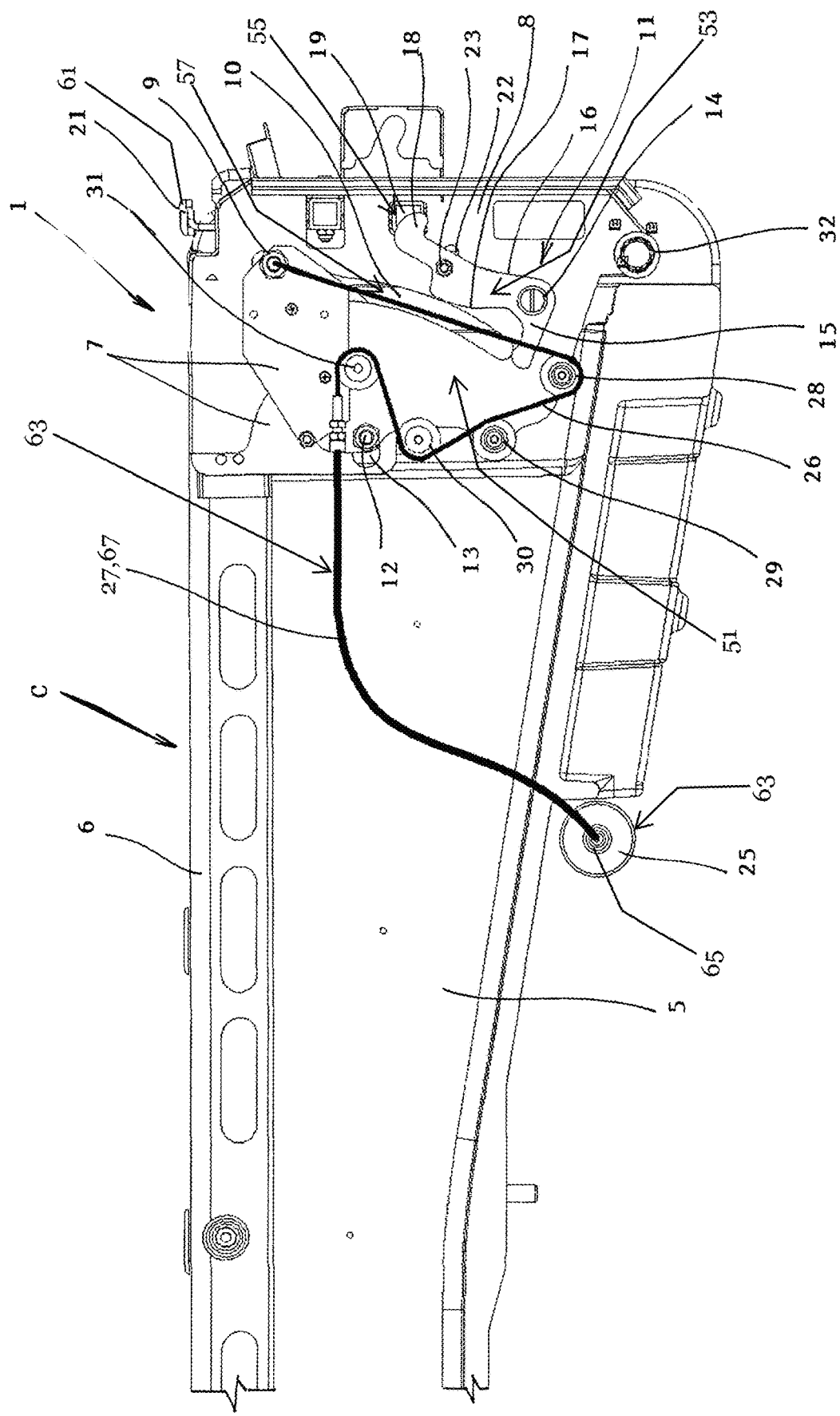

FIG. 2 detailed side view of the foldable ramp in passive position C according to an exemplary embodiment.

Figure 3:
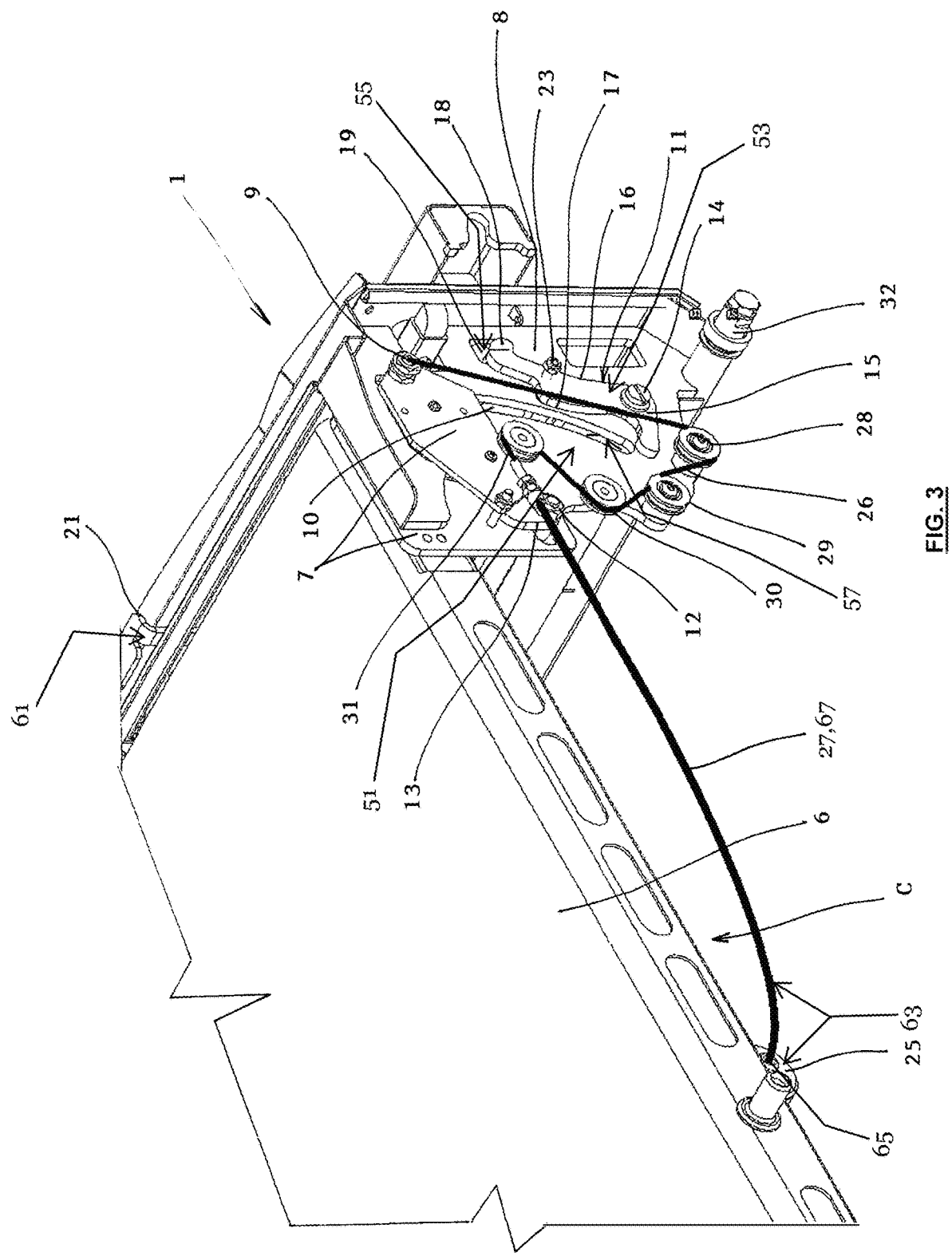

FIG. 3 detailed perspective view of the foldable ramp in passive position C according to an exemplary embodiment.

Figure 4:
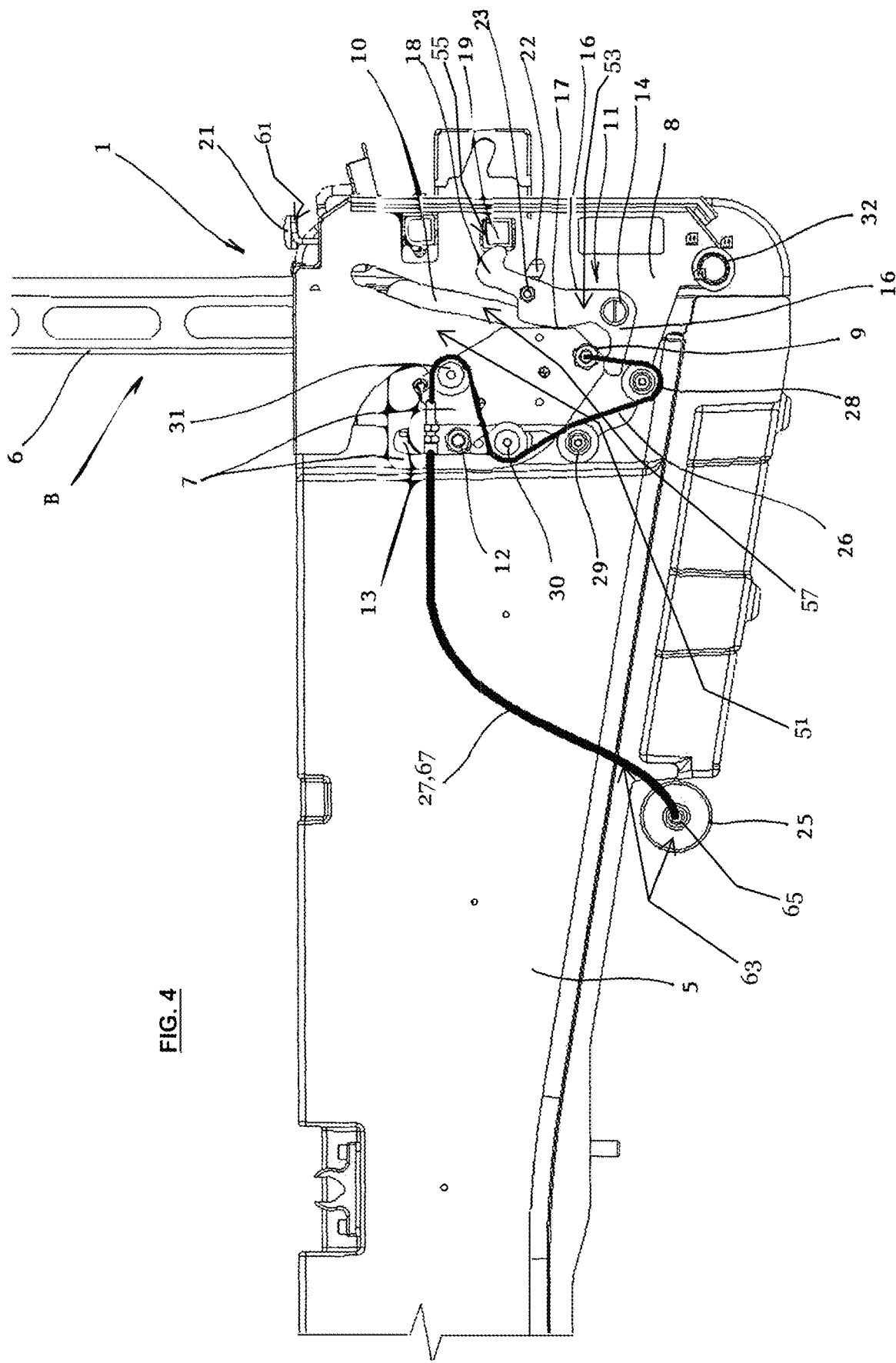

FIG. 4 detailed side view of the foldable ramp in transport position B according to an exemplary embodiment.

Figure 5:
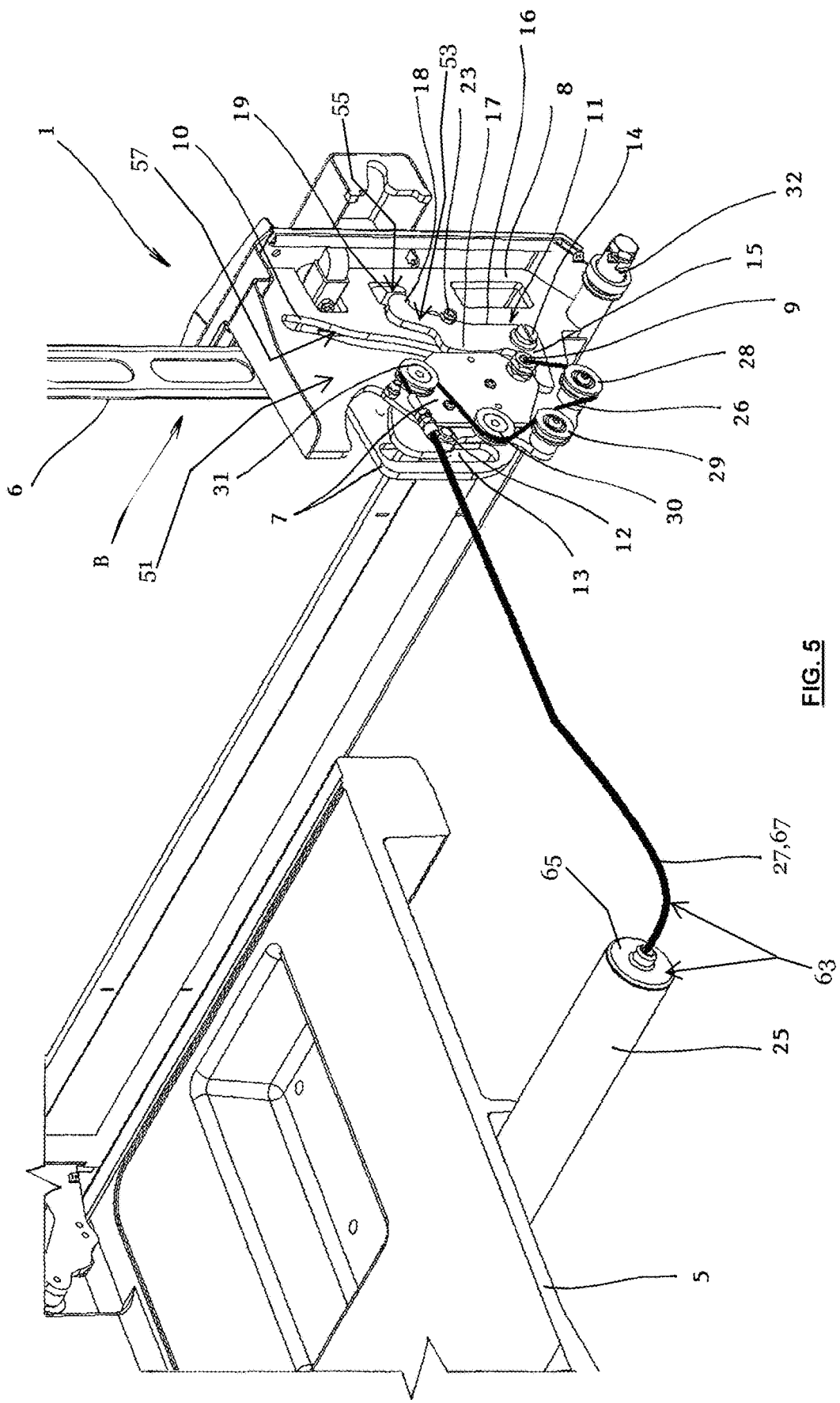

FIG. 5 detailed perspective view of the foldable ramp in transport position B according to an exemplary embodiment.

Figure 6:
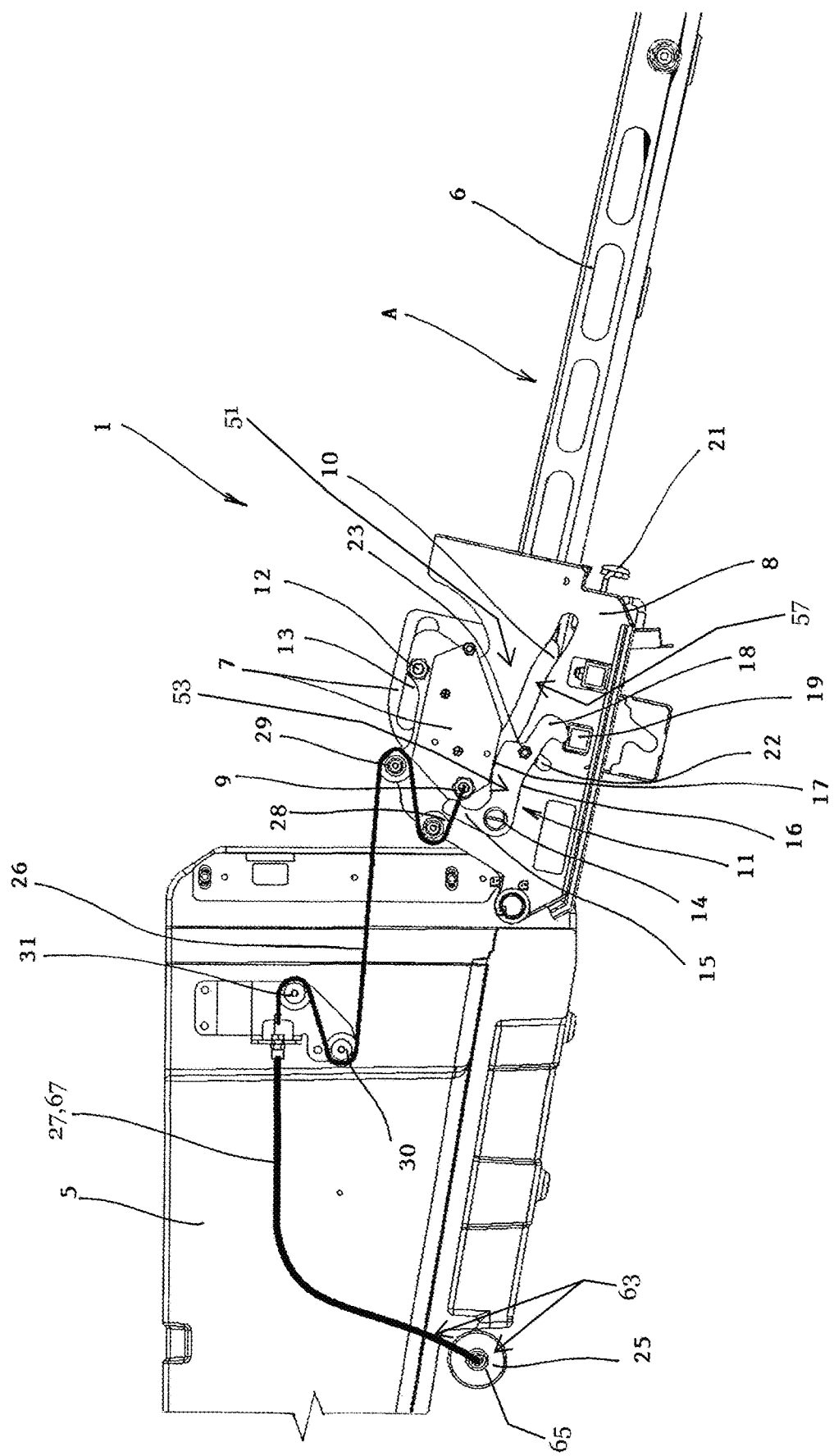

FIG. 6 detailed side view of the foldable ramp in entry position A according to an exemplary embodiment.

Figure 7:
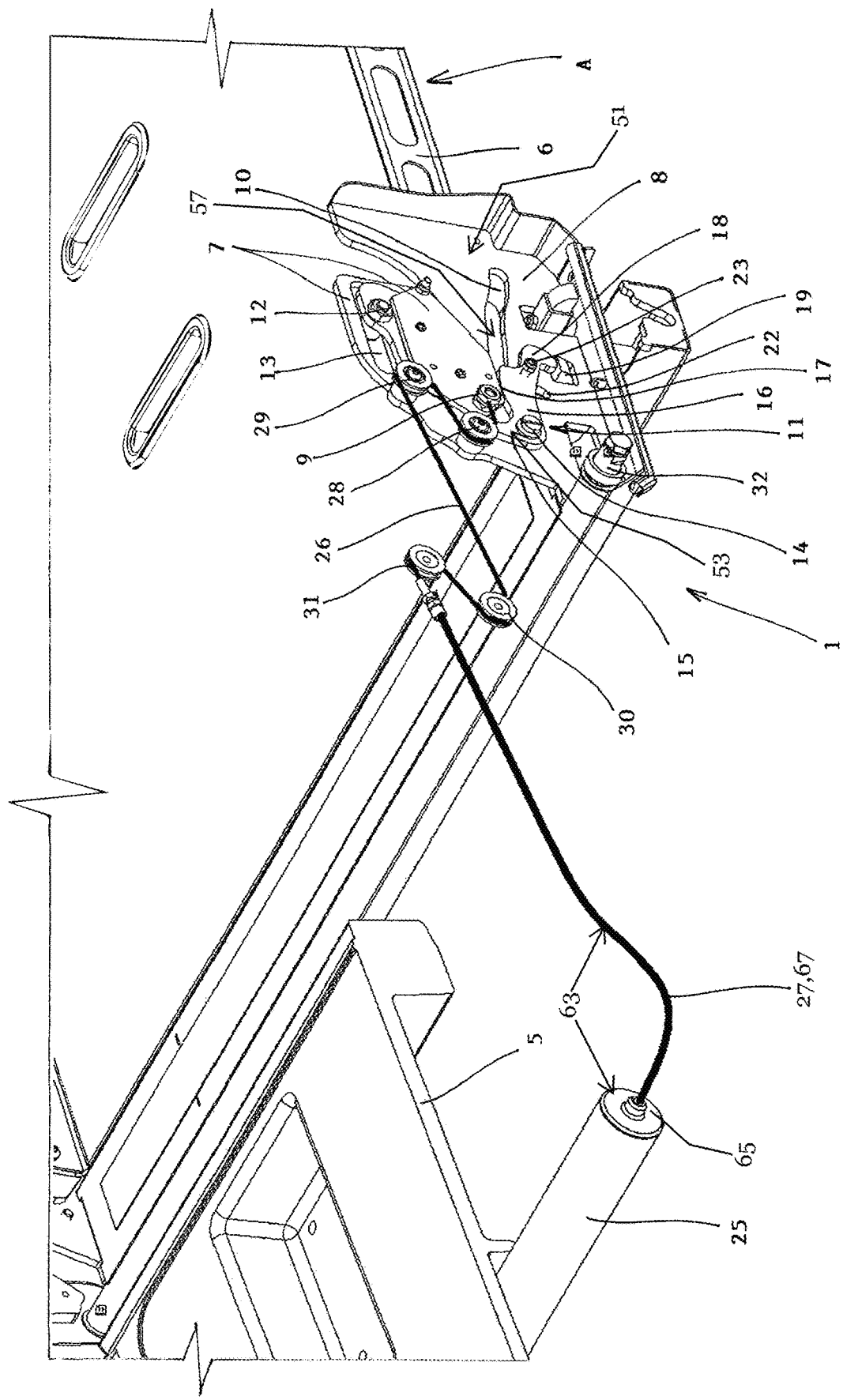

FIG. 7 detailed perspective view of the foldable ramp in entry position A according to an exemplary embodiment.

Figure 8:
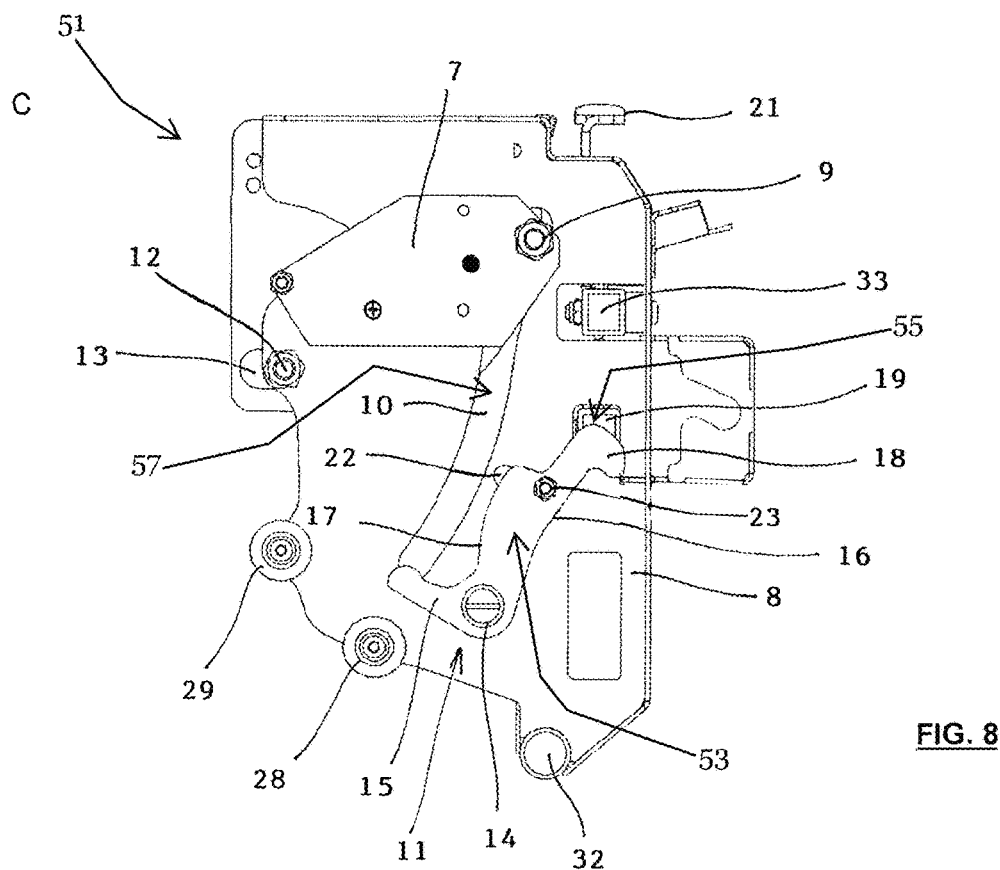

FIG. 8 detailed side view of the tiltable side part with a carrier and a single lever in passive position C according to an exemplary embodiment.

Figure 9:
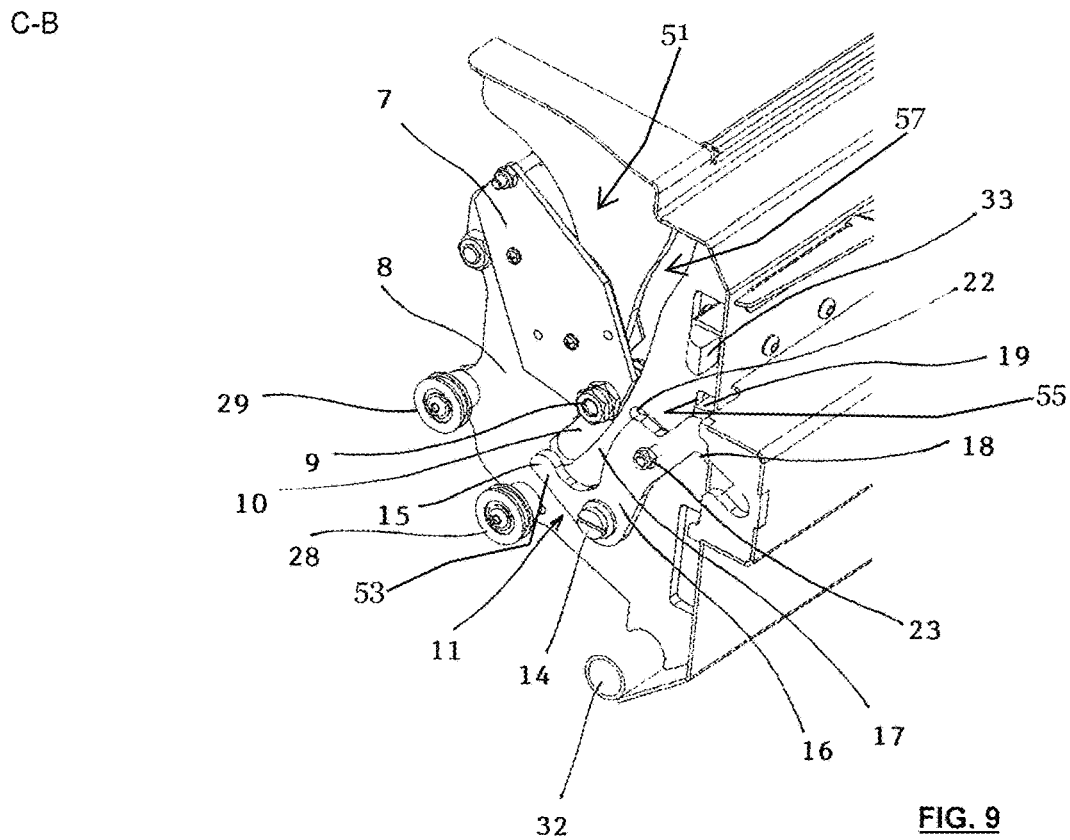

FIG. 9 detailed side view of the tiltable side part with a carrier and a single lever in transition from passive position C to transport position B according to an exemplary embodiment.

Figure 10:
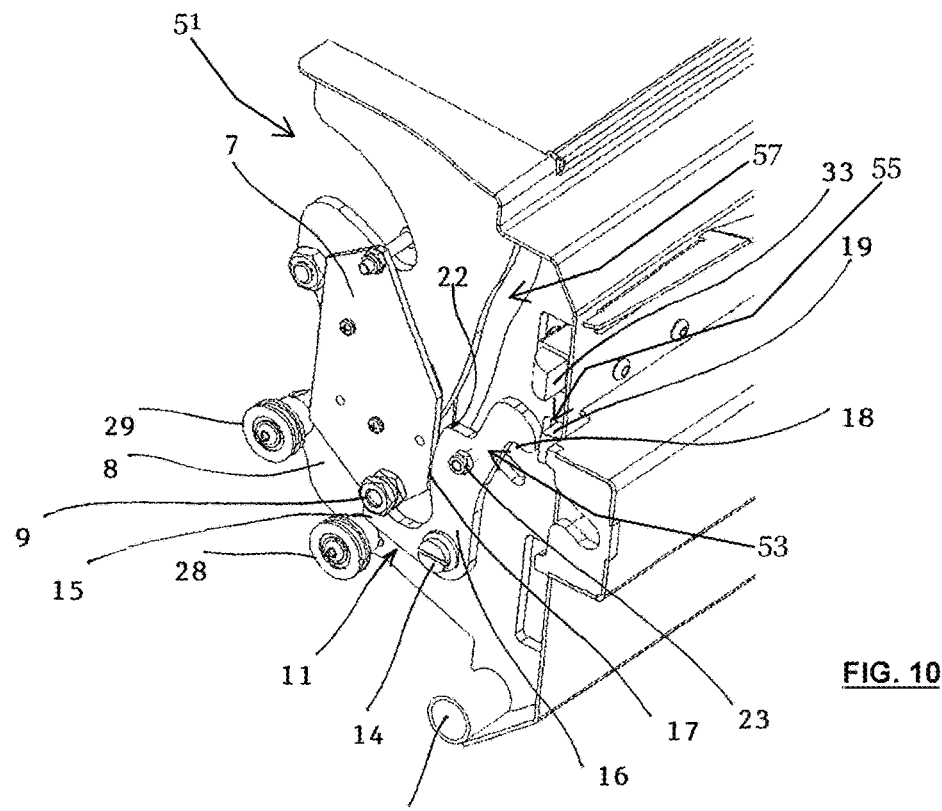

FIG. 10 detailed side view of the tiltable side part with a carrier and a single lever in transport position B according to an exemplary embodiment.

Figure 11:
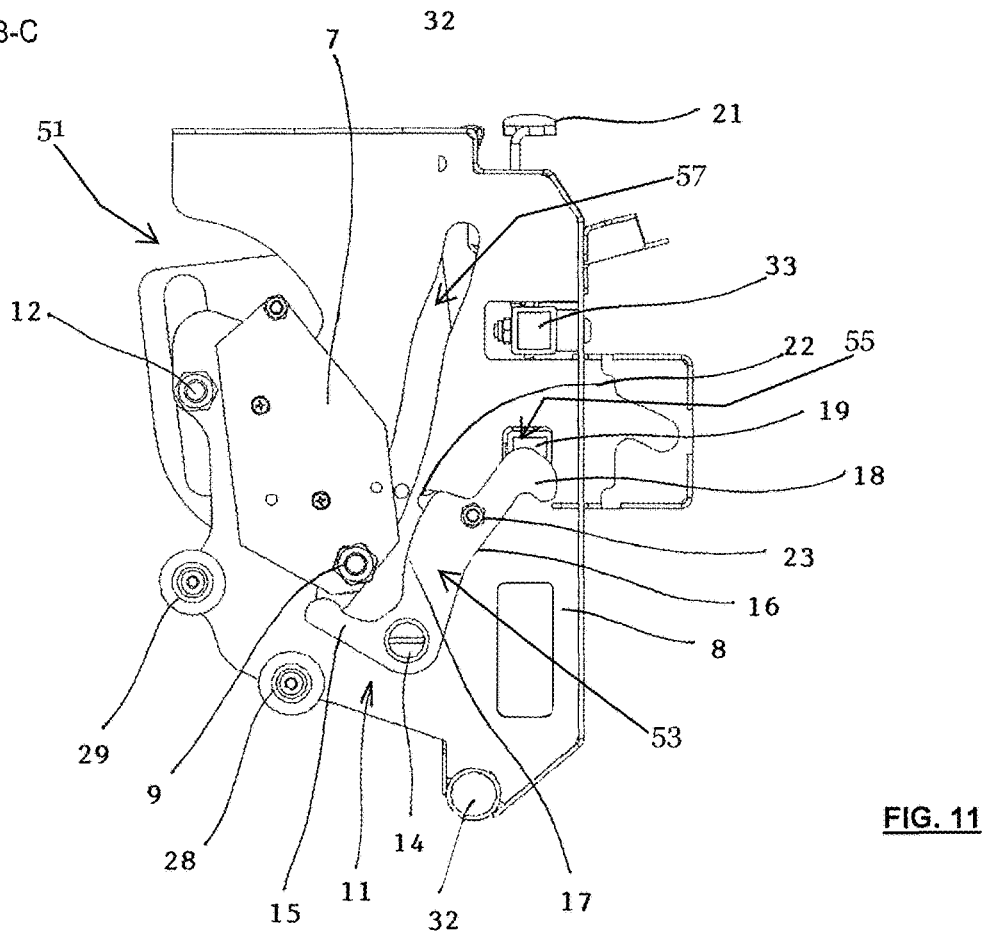

FIG. 11 detailed side view of the tiltable side part with a carrier and a single lever in transition from transport position B to passive position C according to an exemplary embodiment.

Figure 12:
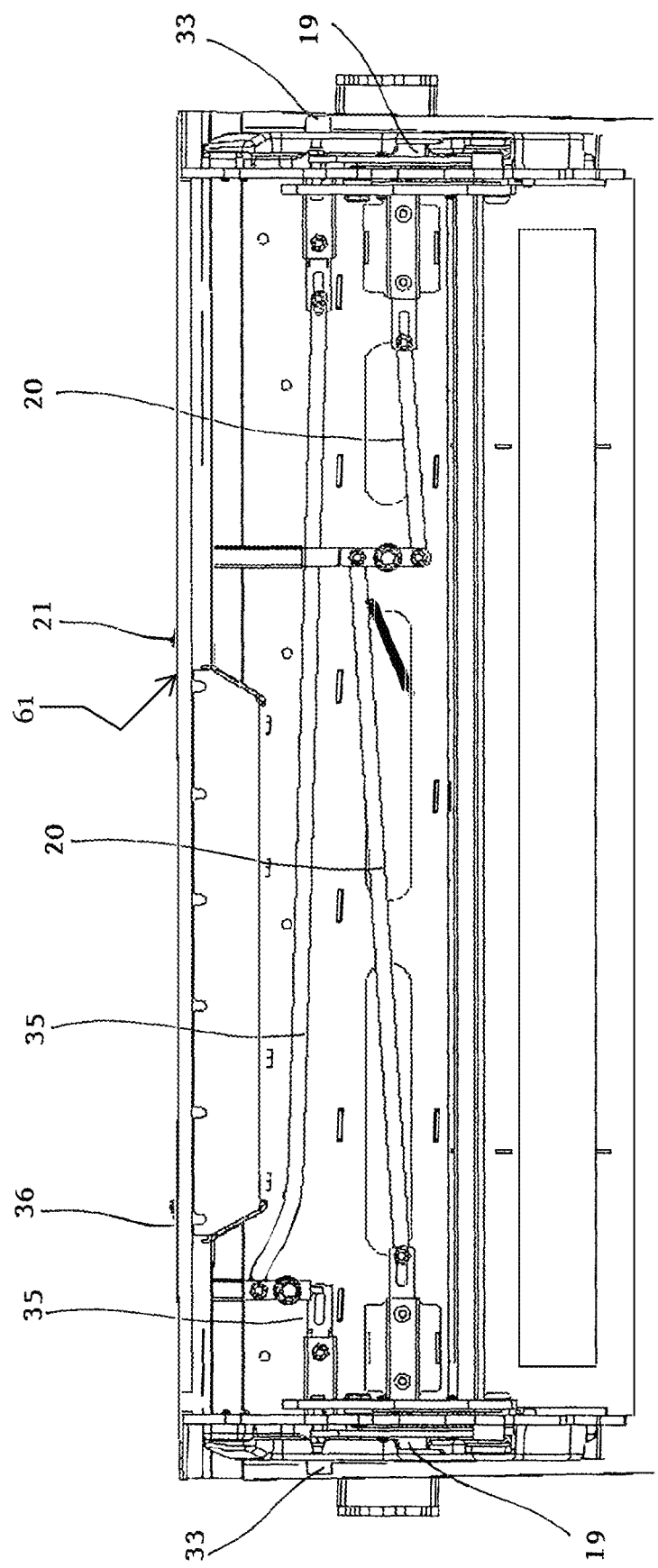

FIG. 12 back view of the inside structure of the foldable ramp according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, functionality, etc. in order to provide a thorough understanding of the various aspects of the claimed disclosure. However, it will be apparent to those skilled in the art having the benefit of the present disclosure that the various aspects of the disclosure claimed may be practiced in other examples that depart from these specific details.

According to a first aspect of the disclosure, a foldable ramp for wheelchair access to a passenger car rear door comprises a one-part or a multi-part entry platform which can be arranged in several positions. In particular, the entry platform may be arranged in an entry position in which the foldable ramp is folded out of the car to allow wheelchair access to the car. In the entry position, the foldable ramp may be oriented at an angle between 5° and 30°, preferably between 10° and 20°, relative to the horizontal. Due to such an orientation of the foldable ramp during access of the wheelchair, the wheelchair may easily and smoothly access the interior of the passenger car. For example, the length of the ramp in a lengthwise direction of the car is larger than 20 cm and preferably less than 5 m, preferably between 50 cm and 2 m. The foldable ramp may further be arranged in a transport position, i.e. a position in which a wheelchair has accessed the interior of the passenger car via its rear door and in which the passenger car may be driven while the wheelchair and the entry platform are stored in the back of the passenger car. In the transport position, the entry platform may be oriented in an upright position, particularly in a vertical position. It is clear, that in the transport position, the entry platform shall preferably have a length which is less than a vertical dimension of the passenger car, in particular a vertical dimension of the back of the passenger car. In an advantageous embodiment of the disclosure, the entry platform may be provided with a profiled upper surface and/or an anti-slip coating in order to facilitate use of the foldable ramp even in bad weather conditions, such as rain and/or snow, and/or to prevent the wheelchair from sliding backwards and/or sideways when accessing the passenger car rear door. Also, the foldable ramp may be arranged in a passive position in which the entry platform is provided in the passenger car in a lying position.

In an exemplary embodiment, the foldable ramp further comprises a pivoting mechanism for mounting the entry platform to the passenger car, and particularly for enabling a pivoting movement of the entry platform, preferably between the entry position, the transport position and the passive position of the entry platform, with respect to the passenger car. The pivoting mechanism may include an interlock having a passive state in which it allows movement of the entry platform relative to the passenger car and an active state in which it fixes the entry platform relative to at least a section of the car. The pivoting mechanism may also include a safety for retaining the interlock in the active state. When moving the entry platform from the passive position into the transport position the interlock is caused to engage the active state and the safety is activated. Therefore, control of the entry platform is facilitated while providing smooth movement of the entry platform between predefined positions. According to an exemplary embodiment of the disclosure, the interlock and/or the safety are made of a suitable material, for example a material which is strong enough to withstand the forces generated by the wheelchair when accessing the passenger car and also light enough so that it can be easily handled, respectively moved and/or pivoted, wherein preferably the material is a metal, such as iron or aluminium, or plastics, such as a hard or duroplastics plastics.

In an exemplary embodiment of the disclosure, the pivoting mechanism of the foldable ramp comprises two tiltable side parts wherein each of the side parts is arranged on one side of the foldable ramp, wherein particularly the sides are located on opposite sides of the foldable ramp. Each of the tiltable side parts may be pivotally attached to the car to allow rotation of the foldable ramp between transport position and entry position.

In a further exemplary embodiment of the disclosure, the pivoting mechanism also includes two carriers each coupled to one of the tiltable side parts. The two carriers are connected with the entry platform via a guiding means. The guiding means may be provided for enabling relative movement of the carriers and therefore of the entry platform with respect to the tiltable side parts. In particular, the guiding means defines a trajectory of rotationally translational movement of the entry platform with respect to the tiltable side parts, preferably when the entry platform moves between the transport position and the passive position. According to a preferred embodiment of the disclosure, the guiding means comprises at least one guiding groove provided in each of the tiltable side parts and at lease one guiding pin arranged to follow the trajectory of rotationally translational movement defined by at least one guiding groove. The at least one guiding groove may terminate in two distal resting portions configured to contact the respective one of the at least one guiding pin when the entry platform is moved between the transport position and the passive position, respectively the transport position and the entry position, and has reached its final positions.

In another exemplary embodiment the foldable ramp according to the disclosure, the interlock comprises a single lever pivotally attached to preferably an outer surface of at least one of the tiltable side parts. The position of the single lever with respect to the tiltable side parts may be fixed, however, the orientation of the single lever with respect to the tiltable side parts may be changed. Preferably, the interlock may be rotated between its passive state in which it allows movement of the platform relative to the car and its active state in which it fixes the platform relative to at least a section of the car. The single lever may comprise a lower arm configured to abut the carrier and an upper arm configured to abut the safety of the pivoting mechanism. Preferably, in the active state of the interlock, the lower arm and the upper arm each abut the carrier respectively the safety in order to prevent the platform from relative movement with respect to at least a section of the car. According to a preferred embodiment of the disclosure, the safety comprises a releasable resting catch configured to retain the interlock in its active state and release the interlock in its inactive state. Particularly, the upper arm comprises a contact pressure surface which in the active state of the interlock is configured to abut the carrier. Preferably, the contact pressure surface is orientated in a substantial upright position, particularly vertical position, preferably during passive position and transport position of the entry platform or in a substantially lying, preferably horizontal, position during entry position of the entry platform.

According to exemplary embodiment of the disclosure, the safety is connected to a preferably mechanical actuation means configured to activate and/or deactivate the safety. In an example embodiment of the foldable ramp, the actuation means only comprises mechanical components, however, alternatively or additionally the actuation means may comprise electronic components. In particular, the actuation means comprises a control lever preferably for manually actuating the safety draw rods connecting the actuation means with the safety. The draw rods may be spring-biased preferably for enabling a fast activation and/or deactivation of the safety by means of the control lever. The control lever may be arranged such that the user may directly actuate the control lever. Due to the spring-biased arrangement activation or deactivation of the safety may be performed without substantial time delays, preferably without any time delay, between manually actuating the controller and activation respectively deactivation of the safety. In another embodiment the control lever is electronically actuated in reaction to a user input. Preferably, both tiltable side parts, the single lever and an arresting catch are interconnected with each other via the draw rods and may be actuated by means of the joined control lever. Therefore, means for interlocking the ramp on both sides of the ramp are provided to increase secure use of the foldable ramp. As only one joined control lever is needed which actuates both single levers via interconnected draw rods, a space saving and cost decreased ramp system is provided.

According to another exemplary embodiment of the disclosure, a further guiding groove is provided in a tiltable side part which is configured to engage a further guiding pin associated with the safety, particularly the single lever, which defines a preferably rotational movement of the safety, particularly the upper arm of the safety, with respect to the pivoting mechanism, particularly the tiltable side part. The further guiding pin is arranged such that it may follow the course of the further guiding groove and therefore may allow rotational movement of the single lever respectively the safety with respect to the pivoting mechanism respectively the tiltable side part.

In an exemplary embodiment of the disclosure, the entry platform and/or the components of the pivoting mechanism, such as the tiltable side parts, the guiding pins and fastening means for fastening the pivoting mechanism to the car may be made of a metal, such as iron or aluminium or plastics, such as hard plastics or duroplastics.

According to a second aspect of the disclosure which may be combined with the first aspect of the disclosure, a foldable ramp for wheelchair access to a passenger car rear door comprises a one-part or a multi-part entry platform which can be arranged in several positions. In particular, the entry platform may be arranged in an entry position in which the foldable ramp is folded out of the car to allow wheelchair access to the car. In the entry position, the foldable ramp may be oriented at an angle between 5° and 30°, preferably between 10° and 20°, relative to the horizontal. Due to such an orientation of the foldable ramp during access of the wheelchair, the wheelchair may easily and smoothly access the interior of the passenger car. For example, the length of the ramp in a lengthwise direction of the car is larger than 20 cm and preferably less than 5 m, preferably between 50 cm and 2 m. The foldable ramp may further be arranged in a transport position, i.e. a position in which a wheelchair has accessed the interior of the passenger car via its rear door and in which the passenger car may be driven while the wheelchair and the entry platform are stored in the back of the passenger car. In the transport position, the entry platform may be oriented in an upright position, particularly in a vertical position. It is clear, that in the transport position, the entry platform shall preferably have a length which is less than a vertical dimension of the passenger car, in particular a vertical dimension of the back of the passenger car. In an advantageous embodiment of the disclosure, the entry platform may be provided with a profiled upper surface and/or an anti-slip coating in order to facilitate use of the foldable ramp even in bad weather conditions, such as rain and/or snow, and/or to prevent the wheelchair from sliding backwards and/or sideways when accessing the passenger car rear door. Also, the foldable ramp may be arranged in a passive position in which the entry platform is provided in the passenger car in a lying position.

In an exemplary embodiment, the foldable ramp further comprises a pivoting mechanism for mounting the entry platform to the passenger car, and particularly for allowing a pivoting movement of the entry platform, preferably between the entry position, the transport position and the passive position of the entry platform, with respect to the passenger car.

A biasing means may be provided for acting against the gravitation force of the entry platform, in particular while the entry platform moves between the entry position and the transport position and/or while the platform moves between the passive position and the transport position, and vice versa. In particular, the biasing means generates a biasing force oriented against the gravitation force in order to counterbalance the weight of the entry platform and/or to ensure a smooth movement of the entry platform between its predefined positions. Also, the entry platform is prevented from falling down, in particular from the transport position into the entry position or the passive position, which could lead to a damage of the foldable ramp and/or to an injury of a user. The biasing means may comprise an actuator, such as a preferably elastic spring, such as a gas spring, a steel spring, for example a tension or compression spring, and a force transmission means connecting the actuator to the pivoting entry platform. For example, the force transmission means may include a rope, a bowden and/or at least one pulley preferably coupled to each other such that they act against the gravitation force of the entry platform while pivoting. The actuator may extend in a direction across the lengthwise axis of the passenger car, preferably for substantially the whole width of the passenger car. Due to the crosswise arrangement of the actuator with respect to the lengthwise axis of the car, an especially space-saving biasing means is provided for smooth and easy control of the foldable ramp without shock actions acting on the foldable ramp is provided.

In an exemplary embodiment of the foldable ramp according to the disclosure, the actuator is force transmittingly connected to the force transmission means, wherein particularly the actuator is configured as a preferably elastic spring and the force transmission means comprises a rope attached to the spring. The rope may be attached to the spring with a first end section of the rope and preferably a first part of the rope which may for example lead into the first end section of the rope is arranged in a bowden. A second part of the rope may protrude from the bowden and may be guided by at least one pulley pivotally attached to the pivoting mechanism, preferably pivotally attached to the tiltable side part. In a further development of the disclosure, the rope, preferably a second end section of the rope distal with regard to the first end section of the rope, is attached to the pivoting mechanism. In an exemplary embodiment, the rope is attached to the carrier. In an example embodiment of the disclosure, the biasing means, in particular the spring, exerts a force larger than 1 N, particularly larger than 5 N, 10 N, 15 N, 20 N or 24 N, on the rope. The spring may for example have a progressive, linear, degressive, constant or almost constant, or progressive with knee spring characteristics. According to a preferred embodiment the spring characteristics is linear in order to provide a constant support when moving the entry platform between its defined resting positions. The spring may be galvanized such that an increased corrosion resistance is achieved. Exemplary spring constants lie in the range of 1.000 N/mm$^2$ to 1.500 N/mm$^2$, preferably equal about 1.200 N/mm$^2$ to 1.250 N/mm$^2$. For example, a length of the spring may vary between 300 mm and 700 mm, particularly between 400 mm and 600 mm, or between 500 mm and 550 mm, and a diameter of the spring may vary between 30 mm and 60 mm, particularly between 35 mm and 55 mm, or between 40 mm and 50 mm. The spring may be configured to withstand a force of at least 20 N and at most 500 N, wherein preferably a maximum spring force may lie in the range of 400 N to 500 N, particularly equal about 460 N to 470 N. Further, the spring may be configured to withstand a deformation of at least 20 mm and at most 400 mm.

In another exemplary embodiment of the disclosure, the at least one pulley is arranged such that its rotational axis is positioned outside the trajectory of rotationally translational movement of the entry platform which may be defined by a guiding means. The guiding means may be configured in accordance with the explanations in regard to the first aspect of the disclosure. Particularly, the at least one pulley is arranged below the guiding means. The guiding means may enable relative movement of the entry platform with respect to the car. Further, the second end of the rope may be attached to a guiding pin attached to the pivoting mechanism and associated to the guiding means. Preferably, the guiding pin is configured to follow the trajectory of rotationally translational movement defined by the guiding means.

In another exemplary embodiment of the disclosure, a second pulley is pivotally arranged on the pivoting mechanism, preferably the tiltable side part, and guiding the rope preferably when the entry platform moves between passive position and transport position and/or between transport position and entry position. Particularly, a third pulley may be provided which is pivotally arranged in a pivotally mechanism, preferably the tiltable side part, and guiding the rope. In a further development of the disclosure, a fourth pulley may be pivotally arranged on the pivoting mechanism, preferably the tiltable side part, and guiding the rope. In a preferred embodiment, the first, second, third and a fourth pulley comprise the same diameter. For example, the diameter of the pulleys may be in the range of 2 cm to 20 cm.

According to an exemplary embodiment of the foldable ramp, the first, second, third and a fourth pulley are arranged at different vertical heights on the pivoting mechanism. The first, second, third and a fourth pulley may be arranged such that the first pulley and the fourth pulley are positioned higher, i.e. at a higher vertical height on the pivoting mechanism, than the second pulley and first pulley. Particularly the rope at least partially circulates the circumference of each of the first, second, third and fourth pulley. Between the individual pulleys, the rope may go in turns from one to the other side of the respective pulley.

In another exemplary embodiment of the disclosure, the third pulley is arranged lower than the fourth pulley and/or the second pulley is arranged higher than the first pulley. This arrangement of the pulleys with respect to the pivoting mechanism allows an optimum force transmission along the draw rods such that the rotation of the foldable ramp between passive position and transport position and/or transport position and entry position may be advantageously controlled.

In a further exemplary embodiment of the disclosure, the actuator extends below the passenger car, preferably allowing a space saving arrangement of the biasing means. The actuator may be arranged in an angle between 45° and 145°, preferably around 90°, relative to the lengthwise axis of the vehicle. The actuator may further be arranged in an angle between ±20°, preferably ±10° or ±5°, relative to a plane defined by a lengthwise axis of the car and a horizontal axis, preferably relative to a horizontal plane.

In another exemplary embodiment of the disclosure, the actuator comprises two springs each connected to a rope and coupled to a bowden associated to a first part of the respective rope, wherein particularly each rope is attached to the pivoting mechanism. This arrangement further increases controlling of the rotational movement of the foldable ramp and further assures smooth movement during rotation of the foldable ramp.

The following features described in relation to exemplary embodiments of the present disclosure may be combined with the preceeding aspects or the embodiments of the disclosure alone or in combination.

The foldable ramp, according to an exemplary embodiment of the disclosure, is designed for vehicles with a lowered floor well in the rear part, and it includes a one-part or multi-part entry platform which is folded out from the vehicle in the entry position, in the transport position it is set vertically inside the vehicle at the edge of the floor well and in the passive position it is arranged horizontally inside the vehicle and it sits on edges of the floor well. According to an exemplary embodiment of the pivoting mechanism, the foldable ramp also includes two tiltable side parts arranged on the opposite sides, pivotally attached to the edge of the floor well, which allow movement from the transport position to the entry position and vice versa, and with a possibility of arrestment in the transport position. There are also two carriers connected to the entry platform via at least one pin that can move in at least one guiding groove, while the shape of the guiding groove defines the trajectory of rotationally translational movement of the entry platform in respect to the tiltable parts when the entry platform moves from the transport position into the passive position. Further, it also includes at least one elastic element operating against the gravitation force and counterbalancing weight of the entry platform while it is moving. Finally, it includes at least one arresting element to secure the entry platform in the transport position and to release it. The disclosure consists preferably in the fact that the arresting element is a single lever attached pivotally to the tiltable side part and arranged so that on its lower arm sits on the carrier in the lower position of the carrier pin in the guiding groove and its upper arm is provided with a contact pressure surface. The upper arm in the lower limit position of the carrier engages behind a releasable arresting catch of the single lever arranged in the tiltable side part, and the contact pressure surface in this position is pushed to the carrier. Therefore, the entry platform in its vertical transport position is not fitted into any vertical guiding groove or vertical recess as it was the case with the known foldable ramps. It is not necessary to lift it up before folding it into the passive position and all you need to do is to release the arresting catch, to release the carrier blocked with the single lever and the entry platform will start folding.

In one advantageous exemplary embodiment of the disclosure, the safety and the interlock may be further developed in that single levers and arresting catches are arranged on both tiltable side parts, while the arresting catches can move out from them by means of springs and they are interconnected via draw rods with a joint control lever so that they can slip into the tiltable side parts when the arrestment of single levers is released. Symmetric arrangement of the single levers allows accurate operation of the foldable ramp when the entry platform is released or secured in the transport position and the control lever situated in the central part of the foldable ramp enables comfortable control with one hand only.

In another advantageous embodiment of the disclosure, hereunder the tiltable side part is provided with a second guiding groove into which fits a single lever pin that defines rotational movement of the upper arm of the single lever when the carrier is arrested and released.

In another advantageous embodiment of the disclosure, the biasing means may be further developed in that an elastic element of the foldable ramp, which operates against the gravitation force and counterbalances weight of the entry platform, is a gas or compression/tension spring. Attached to its end is a rope with the first part placed in a bowden situated between the spring and the edge of the lowered floor well. The second part of the rope protruding from the bowden goes over at least one first pulley pivotally attached to the tiltable side part, while the end of the rope is attached to the carrier. The rope slows down the carrier during the upward movement, i.e. it slows down the entry platform while it is folding into the passive position. On the other hand, the rope pulls the carrier during the downward movement, i.e. when the entry platform is lifted into the transport position.

To ideally use the force of the spring it is advantageous when the first pulley is arranged under the first guiding groove in the tiltable side part in the extended direction of the first guiding groove and the end of the rope is attached to the carrier pin.

In another advantageous exemplary embodiment, the end of the rope may be attached at any place to the carrier, depending on what is appropriate for the design.

In another advantageous exemplary embodiment of the disclosure, a second pulley is pivotally arranged on the tiltable side part and, after the bowden at the edge of the floor well, there is a third pulley and a fourth pulley, both pivotally arranged. The fourth pulley and the third pulley are arranged above the second pulley and the first pulley. The arrangement of the pulleys depends on a specific design of the ramp and the vehicle. When the system is used on vehicles of different types the arrangement of the pulleys and their mutual positions might be different than in the described advantageous embodiment. The rope between the individual pulleys goes in turns from one and the other side of the respective pulleys. In this embodiment the springs additionally slow down the entry platform when it moves from the transport position into the entry position and, on the contrary, they pull the entry platform when it is lifted up from the entry position into the transport position.

To ensure smooth movement of the rope and to deal with the height differences in the positions of the foldable ramp it is advantageous if the third pulley is arranged lower than the fourth pulley and the second pulley is arranged higher than the first pulley.

It is also advantageous to use two springs arranged under the lowered floor well crosswise to the lengthwise axis of the vehicle, each of them for one side of the foldable ramp.

Advantages of the foldable ramp under this disclosure consist in elimination of high demands on physical strength of the operating person while manually moving the foldable ramp between its working positions, the movement of the foldable ramp is more even, shock actions are eliminated, its safety is improved and its control is easier.

In an exemplary embodiment, the foldable ramp 1 shown in FIG. 1 is created by an additional modification of a vehicle 4 with a sufficient overhead clearance and width to load a wheelchair 2 with a passenger 3. The vehicle 4 has a lowered floor well 5 in its rear part that slopes down towards the rear of the vehicle. The foldable ramp 1 with an entry platform 6, which may be designed as one-part or multi-part, is controlled manually and it has no electric or other drives. FIG. 1 shows all working positions of the foldable ramp 1 or entry platform 6. In the so-called passive position C the entry platform 6 is folded inside the vehicle 4 and placed on edges of the floor well 5, it forms a part of the floor of the vehicle 4 and the vehicle 4 can be used for regular operation. In the transport position B the entry platform 6 is set and arrested vertically in the rear part of the vehicle 4. The wheelchair 2 with a passenger 3 is inside the vehicle 4 in front of the entry platform 6, standing in the lowered floor well 5 and fixed with fasteners. In the transport position B the vehicle is used to transport a passenger 3 in the wheelchair 2. When the wheelchair 2 is entering the vehicle 4 the entry platform 6 is in the so-called entry position A in which it is folded out from the rear part of the vehicle 4 and propped with one end against the ground or support not shown in the drawing and its other end is set on the edge of the lowered floor well 5.

The foldable ramp 1 according to the example embodiment shown in FIG. 1 comprises a pivoting mechanism 51 with two tiltable side parts 8 each arranged on an opposite side of the foldable ramp 1 and pivotally attached to the car 4 to allow movement of the platform 6 relative to the car 4. The pivoting mechanism 51 also comprises two carriers 7 each coupled to one of the tiltable side parts 8 and connected with the entry platform 6 via a guiding means 57 enabling relative movement of the carriers 7 and the entry platform 6 with respect to the tiltable side parts 8. Further, the pivoting mechanism 51 includes an interlock 53 having a passive state in which it allows said movement of the platform 6 relative to the car 4 and an active state in which it fixes the platform relative to the car 4 to prevent relative movement. Also, a safety 55 may be provided for retaining the interlock 53 in the active state.

When the entry platform 6 is moving from the transport position B to the entry position A two oppositely arranged tiltable side parts 8 tilt out from side pockets of the lowered floor well 5 while the entry platform 6 is firmly arrested between them with an arresting device. The tiltable side parts 8 are pivotally attached to the lower edge of the lowered floor well 5 with hinges 32. Tiltable side parts 8 swivel on the hinges 32 and the entry platform 6 swivels jointly with the tiltable side parts 8. In the transport position B the tiltable side parts 8 are fixed with arresting catches 33 on the tiltable side parts 8 that automatically fall into openings on the sides of the lowered floor well 5, while the tiltable side parts 8 are lifted up in the vertical position. The arresting catches 33 of the tiltable side parts 8 are released at the same time with draw rods 35 linked to the control lever 36. After they are released the foldable ramp 1 can be moved from the transport position B to the entry position A.

In order to move the entry platform 6 from the transport position B to the passive position C the tiltable side parts 8 remain in place secured with the arresting catches 33 and the entry platform 6, after the arresting element on one side or on both sides of the foldable ramp 1 is released, moves with rotationally translational motion in respect to the tiltable side parts 8. The axis of rotation of this motion is not fixed but it moves upwards in the course of the motion so that the entry platform 6 can overcome the difference in heights of the lower edge of the lowered floor well 5 and the upper edge of lowered floor well 5 where it needs to be placed in the passive position C. There are two carriers 7 to perform rotationally translational movement, each of them assigned to one of the tiltable side parts 8. The carrier 7 consists of two parts firmly attached to each other, one of them arranged on the inner side of tiltable side part 8, the other on the outer side of the tiltable side part 8. The entry platform 6 is attached to the parts of the carrier 7 which is on the inner side of the tiltable side parts 8. The two parts of the carrier 7 have different shapes but they are mutually connected and each carrier 7 moves as a whole in respect to the tiltable side part 8. The guiding means 57 comprises at least one guiding groove 10, 13 provided in each of the tiltable side parts and at least one guiding pin arranged to engage the guiding groove 10, 13. The accurate trajectory of rotationally translational movement of the entry platform 6 is defined by guiding grooves 10, 13 and by the pins 9, 12. The first guiding groove 10 in the tiltable side part 8 has an arched shape and it engages the pin 9 of the carrier 7. The guiding groove 13 in the carrier 7, which engages the pin 12 of the tiltable side part 8, is straight. The shapes and mutual orientation of the guiding grooves 10, 13 makes it possible for the entry platform 6 to smoothly move from the transport position B to the passive position C. It is also possible to perform rotationally translational movement with only one of the guiding grooves 10, 13 but the movement accuracy is lowed and the clearance is higher.

Unlike the foldable ramps known from the previously used designs, the first guiding groove 10 in the tiltable side part 8 does not have any vertical recess at its end to engage the pin 9 of the carrier 7 and thus to vertically arrest the entry platform 6 in the transport position B. The lower part of the first guiding groove 10 is continuously arched. As shown in particular with regard to FIGS. 3 and 12, the safety 55 is connected to a mechanical actuation means 61 configured to activate and to deactivate the safety 55. The actuation means 61 comprises a control lever 21 for manually actuating the safety 55 and draw rods 20 (FIG. 12). The interlock 53 comprises a single lever 11 pivotally attached to an outer surface of the at least one tiltable side part 8. The arresting element of the foldable ramp 1 under this disclosure consists of a single lever 11 arranged in the tiltable side parts 8. Each single lever 11 is pivotally attached to the tiltable side part 8 and passes essentially in parallel with the first guiding groove 10. The lower arm 15 and the upper arm 16 of the single lever 11 form an L-shaped angle, with a pivot 14 in its vertex angle, which forms an axis of rotation of the single lever 11. On the upper arm 16 there is a cam-shaped contact pressure surface 17 to sit down on the side of the carrier 7. In its upper part the upper arm 16 is terminated with a nose 18 oriented in the opposite direction than the lower arm 15. The single lever 11 revolves around the pivot 14, while the trajectory and the angular range of the movement is defined with the second guiding groove 22 in the tiltable side part 8, which has an arch shape and engages the pin 23 of the single lever 11.

In each tiltable side part 8 there is an arresting catch 19 of the single lever 11 on a spring pushed by the side surface of the nose 18 into the tiltable side part 8. Once the entry platform 6 moves into the transport position B, i.e. it is lifted up into the upright vertical position, the carrier 7 changes its position as shown in FIG. 1 through 4 and in FIGS. 8 to 11. The pin 9 of the carrier 7 reaches the lower end of the first guiding groove 10 in the tiltable side part 8 and the lower part of the carrier 7 by the weight of the entry platform 6 attached to the carrier 7 sits down on the lower arm 15 of the single lever 11 and pushes on it. The single lever 11 revolves around the pivot 14 and the nose 18 overshoots over the edge of the arresting catch 19, it disengages and prevents the nose 18 from returning into its original position. The cam-shaped protuberant contact pressure surface 17 of the upper arm 16 of the single lever 11 pushes on the side of the carrier 7 which has an appropriately shape. Without released arresting catches 19 the carrier 7 cannot drive up in the first guiding groove 10 and thus the entry platform 6 cannot fold into the passive position C spontaneously or by force. This is only possible after the arresting catches 19 of the single levers 11 are released and after they enable movement of both the carriers 7. This is performed by means of a manual control lever 21 which is connected with both the arresting catches 19 by means of a system of draw rods 20.

To make sure that operation of the foldable ramp 1 is smooth, without shock actions and easily controllable in all stages of transition between positions A, B and C, a biasing means 63 is provided for acting against the gravitation force of the entry platform 6. The biasing means 63 means includes an actuator 65, such as a spring 25 or two springs 25 according to the example embodiment being referred to in the drawings. The two springs 25 are arranged crosswise the driving direction under the lowered floor well 5 of the vehicle 4. In the described example of embodiment the springs are wound but gas springs may be used as well. The biasing means 63 further includes a force transmission means 67 which according to the shown example embodiment of the disclosure comprises a rope 26, a bowden 27 and pulleys 28, 29, 30 and 31. The force transmission means connects the actuator 65 to the pivoting entry platform 6. The springs 25 are placed in cylinder casings and their ends are connected with ropes 26. Each spring 25 is provided with a separate bowden 27 with a rope 26 leading to the tiltable side part 8. The bowden 27 ends on the side edge of the lowered floor well 5 and the rope 26 goes over the first pulley 28, pivotally attached in the tiltable side part 8. End of the rope 26 is attached to the pin 9 of the carrier 7 or it may be attached to another part of the carrier 7. It is advantageous to arrange the first pulley 28 under the first guiding groove 10 in the tiltable side part 8, so that the direction of the tension of the rope 26 corresponds to the direction of the first guiding groove 10. In this example of embodiment the springs 25 help to lift up the entry platform 6 from the passive position C to the transport position B and prevent the free fall of the entry platform 6 from the transport position B to the passive position C after the arresting catches 19 are released. Tension of the rope 26 is constant over the whole trajectory of the movement, while the force necessary to control the movement is minimal.

In another example of embodiment the springs 25 also help to lift up the entry platform 6 also from the entry position A to the transport position B and, on the contrary, they prevent the free fall of the entry platform 6 with tiltable side parts 8 after arresting catches 32 of the tiltable side parts 8 are released. In this example of embodiment the rope 26 is conducted also over the second pulley 29, the third pulley 30 and the fourth pulley 31. The fourth pulley 31 and the third pulley 30 form a counter-directional pair attached to the edge of the lowered floor well 5. The second pulley 29 is attached to the tiltable side part 8 and forms a counter-directional pair with the first pulley 28. The pulleys 28, 29, 30 and 31 are arranged in this order in ascending heights. The third pulley 30 and second pulley 29 are approximately at the same heights and when the tiltable side parts 8 are out in the entry position A their horizontal distance increases. This causes tension on the rope 26 and the springs 25 operate against the folding direction of the entry platform 6. On the contrary, the entry platform 6 is lifted up to the transport position B and the springs 25 help the movement and reduce physical force needed to lift up the entry platform 6. The central position of the end of the rope 26 is in the transport position B, when the pin 9 of the carrier 7 is at the lower end of the first guiding groove 10. During the movement into the passive position C the rope 26 extends by the length of the first guiding groove 10 and, during the return into the transport position B, it again returns to its original length. When the tiltable side parts 8 are out the position of the end of the rope 26 does not change and the pin 9 of the carrier 7 remains at the lower end of the first guiding groove 10. However, the rope 26 extends approximately by the same length in the middle part between second pulley 29 and the third pulley 30. The force of the spring 25 is thus effectively used for smooth movement of the foldable ramp 1 between all the working positions A, B and C. It is also possible to use only one spring 25 for the whole foldable ramp 1.

The foldable ramp for vehicles under this disclosure may be particularly used for wheelchairs with passengers and also other equipment with wheels to enter the vehicles.

The features disclosed in the above description, the figures and the claims may be significant for the realization of the invention in its different embodiments individually as in any combination.

REFERENCE LIST 1 foldable ramp
2 wheelchair
3 passenger
4 vehicle
5 lowered floor well
6 entry platform
7 carrier
8 tiltable side part
9 carrier pin
10 first guiding groove in the tiltable side part
11 single lever
12 tiltable side part pin 13 guiding groove in the carrier
14 single lever pivot
15 lower arm of the single lever
16 upper arm of the single lever
17 contact pressure surface
18 nose
19 arresting catch of the single lever
20 draw rod
21 control lever
22 second guiding groove in the tiltable side part
23 single lever pin
25 spring
26 rope
27 bowden
28 first pulley
29 second pulley
30 third pulley
31 fourth pulley
32 hinge of the tiltable side part
33 arresting catch of the tiltable side part
35 draw rod
36 control lever
51 pivoting mechanism
53 interlock
55 safety
57 guiding means
61 actuation means
63 biasing means
65 actuator
67 transmission means
A entry position of the entry platform
B transport position of the entry platform
C passive position of the entry platform
L lengthwise axis

The invention claimed is:

1. A foldable ramp for wheelchair access to a passenger car rear door, comprising:
a one-part or multi-part entry platform configured to be arranged in several positions including an entry position where the ramp is configured to be folded out of the car to allow wheelchair access to the car, a transport position where the entry platform is configured to be arranged in the car in an upright position, and a passive position where the entry platform is configured to be arranged in the car in a lying position; and
a pivoting mechanism configured to mount the platform to the passenger car, the pivoting mechanism including:
an interlock having a passive state in which the interlock is configured to allow movement of the platform relative to the car and an active state in which the interlock is configured to fix the platform relative to at least a section of the car; and
a safety configured to retain the interlock in the active state, wherein in response to the platform being moved from the passive position into the transport position, the interlock engages the active state and the safety is activated.

2. The foldable ramp according to claim 1, wherein the pivoting mechanism comprises two tiltable side parts each arranged on opposite sides of the foldable ramp and pivotally attached to the car, and configured to allow rotation between the transport position and the entry position.

3. The foldable ramp according to claim 2, wherein the pivoting mechanism further comprises: two carriers each coupled to one of the tiltable side parts and connected with the entry platform via a guide configured to enable relative movement of the two carriers and the entry platform with respect to the tiltable side parts, wherein:
the guide is configured to define a trajectory of rotationally translational movement of the entry platform with respect to the tiltable side parts when the entry platform moves between the transport position and the passive position; and
the guide comprises: at least one guiding groove provided in each of the tiltable side parts, and at least one guiding pin arranged to follow the trajectory of rotationally translational movement defined by the at least one guiding groove.

4. The foldable ramp according to claim 3, wherein at least one of the side parts includes a further guiding groove configured to engage a further guiding pin associated with a single lever of the interlock that is pivotally attached to an outer surface of the at least one of the side parts, the further guiding groove defining a rotational movement of an upper arm of the interlock with respect to the at least one of the side parts.

5. The foldable ramp according to claim 1, wherein:
the interlock comprises a single lever pivotally attached to an outer surface of at least one of two tiltable side parts, the single lever including a lower arm configured to abut a carrier, and an upper arm configured to abut the safety of the pivoting mechanism;
the safety comprises a releasable arresting catch configured to retain the interlock in its active state and to release the interlock in its inactive state; and
the upper arm comprises a contact pressure surface, which in the active state of the interlock, is configured to abut the carrier and/or is oriented in an upright position or in a lying position.

6. The foldable ramp according to claim 5, wherein:
the safety is connected to a mechanical actuator configured to activate and/or deactivate the safety, the mechanical actuator including a control lever configured to manually actuate the safety and draw rods connecting the mechanical actuator with the safety; and
on both of the two tiltable side parts, a single lever and an arresting catch are arranged, which are interconnected with each other via the draw rods and actuated by a joint control lever.

7. A foldable ramp for wheelchair access to a passenger car door, comprising:
a one-part or multi-part entry platform that is configured to be arranged in several positions including an entry position where the ramp is folded out of the car to allow wheelchair access to the car, a transport position where the entry platform is arranged in the car in an upright position, and a passive position where the entry platform is arranged in the car in a lying position;
a pivoting mechanism configured to mount the entry platform to the passenger car; and
a biasing means configured to act against a gravitation force of the entry platform while:
the entry platform moves between the entry position and the transport position, and/or
the platform moves between the passive position and the transport position, wherein:
the biasing means includes an actuator, and a force transmitter configured to connect the actuator to the pivoting entry platform; and
the actuator extends in a direction across a lengthwise axis of the car.

8. The foldable ramp according to claim 7, wherein the actuator extends below the car.

9. The foldable ramp according to claim 7, wherein the actuator comprises two springs each connected to a rope and coupled to a bowden associated to a first part of the respective rope, each of the ropes being attached to the pivoting mechanism.

10. The foldable ramp according to claim 7, wherein the actuator is a spring, and the force transmitter is: a rope, a bowden, and/or a pulley.

11. The foldable ramp according to claim 7, wherein the actuator is arranged in an angle between 45° and 145° relative to a lengthwise axis of the car.

12. The foldable ramp according to claim 7, wherein the actuator is arranged in an angle between ±20° relative to a plane defined by a lengthwise axis of the car and a horizontal axis.

13. The foldable ramp according to claim 7, wherein the actuator is force-transmittingly connected to the force transmitter, the actuator being a spring and the force transmitter being a rope attached to the spring at a first end section of the rope, wherein a first part of the rope leading into the first end section of the rope is arranged in a bowden and a second part of the rope protruding from the bowden is guided by at least one pulley pivotally attached to the pivoting mechanism, a second end section of the rope being attached to a carrier of the pivoting mechanism.

14. The foldable ramp according to claim 13, wherein the at least one pulley is arranged such that its rotational axis is positioned outside a trajectory of rotationally translational movement of the platform defined by a guide configured to enable relative movement of the platform with respect to the car, wherein the at least one pulley is arranged below the guide, and/or the second end of the rope is attached to a guiding pin of the guide.

15. The foldable ramp according to claim 13, wherein:
a second pulley of the at least one pulley is pivotally arranged on the pivoting mechanism and configured to guide the rope,
a third pulley of the at least one pulley is pivotally arranged on the pivoting mechanism and configured to guide the rope, and
a forth pulley of the at least one pulley is pivotally arranged on the pivoting mechanism and configured to guide the rope, a first pulley of the at least one pulley, the second pulley, the third pulley, and the forth pulley have a same diameter.

16. The foldable ramp according to claim 15, wherein:
the first and second pulleys and the third and fourth pulleys are arranged at different vertical heights,
the fourth pulley and the third pulley are positioned higher than the second pulley and the first pulley, and
the rope at least partly circulates corresponding circumferences of each of the first, second, third and fourth pulleys, and/or the rope between the first, second, third, and fourth pulleys goes in turn from one to another side of the respective pulley of the at least one pulley.

17. The foldable ramp according to claim 16, wherein:
the third pulley is arranged lower than the fourth pulley, and/or
the second pulley is arranged higher than the first pulley.

* * * * *